(12) United States Patent
Hrovat et al.

(10) Patent No.: US 6,193,628 B1
(45) Date of Patent: Feb. 27, 2001

(54) VEHICLE SHIFT QUALITY USING A SUPPLEMENTAL TORQUE SOURCE

(75) Inventors: Davorin David Hrovat, Ann Arbor; Jahanbakhsh Asgari; Michael Glenn Fodor, both of Dearborn, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/376,731

(22) Filed: Aug. 17, 1999

(51) Int. Cl.$^7$ ...................................................... B60K 1/02
(52) U.S. Cl. ................................................................ 477/3
(58) Field of Search .............................................. 477/2, 3

(56) References Cited

U.S. PATENT DOCUMENTS

| | | |
|---|---|---|
| 4,252,208 | 2/1981 | Heidemeyer et al. . |
| 4,411,171 | 10/1983 | Fiala . |
| 4,458,156 | 7/1984 | Maucher et al. . |
| 5,613,920 | 3/1997 | Uno et al. . |
| 5,833,570 | 11/1998 | Tabata et al. . |

*Primary Examiner*—Dirk Wright
(74) *Attorney, Agent, or Firm*—Kark Vick

(57) ABSTRACT

Several methods are disclosed for application in a vehicle comprising an engine, an electrical machine coupled to provide supplemental torque to a torque provided by the engine, a transmission having an input coupled to receive torque provided by the engine, and at least one wheel shaft driven by an output of the transmission, the wheel shaft having a driven end and an end coupled to a respective wheel of the motor vehicle. In one embodiment, a method for suppressing driveline oscillations comprises: for at least one wheel shaft, sensing a difference in rotational speed between the driven end of the wheel shaft and the wheel shaft's respective wheel, and generating a torque command for the electrical machine to supply a torque which is a function of the difference. In a second embodiment, a method for suppressing driveline oscillations comprises sensing a rotational speed at the output of the transmission to generate a transmission output speed signal, and generating a torque command for the electrical machine to supply a torque which is a function of the transmission output speed signal. In a third embodiment, a method for suppressing driveline oscillations comprises sensing a rotational speed of the engine to generate an engine speed signal; filtering the engine speed signal to substantially eliminate at least a low-frequency range of the engine speed signal below a frequency range of the oscillations and thereby generate a second signal; and generating a torque command for the electrical machine to supply a torque which is a function of the second signal.

20 Claims, 5 Drawing Sheets

VEHICLE SHIFT QUALITY USING A SUPPLEMENTAL TORQUE SOURCE

BACKGROUND OF THE INVENTION

1. Field of the Invention

The present invention relates to use of a supplemental torque source to improve shift quality in a motor vehicle.

2. Description of the Related Art

Refer first to FIG. 1, an illustration of typical driven wheel torques during an automatic transmission upshift event, such as from first gear to second gear. (The upshift event begins at t=1.4 seconds on the horizontal axis and is complete at about t=2.0 seconds.) The curve reflecting a system with a torque converter shows a torque "hole" at about t=1.4 seconds due to engagement of the shifting clutch and subsequent transfer of torque from the offgoing to the oncoming friction element. Shudder-like oscillations, or "shuffle" in driven wheel torque then continue during the "intertia phase" of the shift until about t=2.0 seconds.

In order to reduce cost and improve the fuel efficiency of a motor vehicle with an automatic transmission, it has been proposed to remove the vehicle's torque converter. The resulting effect of subtracting the very significant damping effect of the torque converter is also shown in FIG. 1. The torque hole at t=1.4 seconds is larger, the oscillations up to t=2.0 seconds are larger, and very substantial oscillations in wheel torque continue beyond t=3.0 seconds. Obviously, much is lost in damping of wheel torque oscillations by removal of the torque converter.

Wheel torque oscillations are readily felt by the occupants of the vehicle. Therefore, a system which allows for removal of the torque converter for cost savings, particularly in a hybrid electric vehicle, and which can provide alternate damping for wheel torque oscillations will prove advantageous.

SUMMARY OF THE INVENTION

It is an object of the present invention to provide damping of wheel torque in a motor vehicle, in order to improve comfort for occupants of the vehicle.

It is a further object of the present invention to facilitate removal of the torque converter of a motor vehicle without introducing objectionable wheel torque oscillations, particularly during transmission shift events.

The present invention is adapted for application in a motor vehicle comprising an engine, an electrical machine coupled to provide supplemental torque to a torque provided by the engine, a transmission having an input coupled to receive torque provided by the engine, and at least one wheel shaft driven by an output of the transmission, the wheel shaft having a driven end and an end coupled to a respective wheel of the motor vehicle.

In one embodiment, the present invention provides a method for suppressing driveline oscillations comprising: for at least one wheel shaft, sensing a difference in rotational speed between the driven end of the wheel shaft and the wheel shaft's respective wheel, and generating a torque command for the electrical machine to supply a torque which is a function of the difference.

In a second embodiment, the present invention provides a method for suppressing driveline oscillations comprising sensing a rotational speed at the output of the transmission to generate a transmission output speed signal, and generating a torque command for the electrical machine to supply a torque which is a function of the transmission output speed signal.

In a third embodiment, the present invention provides a method for suppressing driveline oscillations comprising sensing a rotational speed of the engine to generate an engine speed signal; filtering the engine speed signal to substantially eliminate at least a low-frequency range of the engine speed signal below a frequency range of the oscillations and thereby generate a second signal; and generating a torque command for the electrical machine to supply a torque which is a function of the second signal.

The present invention allows removal of a vehicle's torque converter without introduction of objectionable oscillations in the driveline of the vehicle. Cost and fuel-efficiency advantages will result.

DETAILED DESCRIPTION OF THE PREFERRED EMBODIMENT

Figure 2:
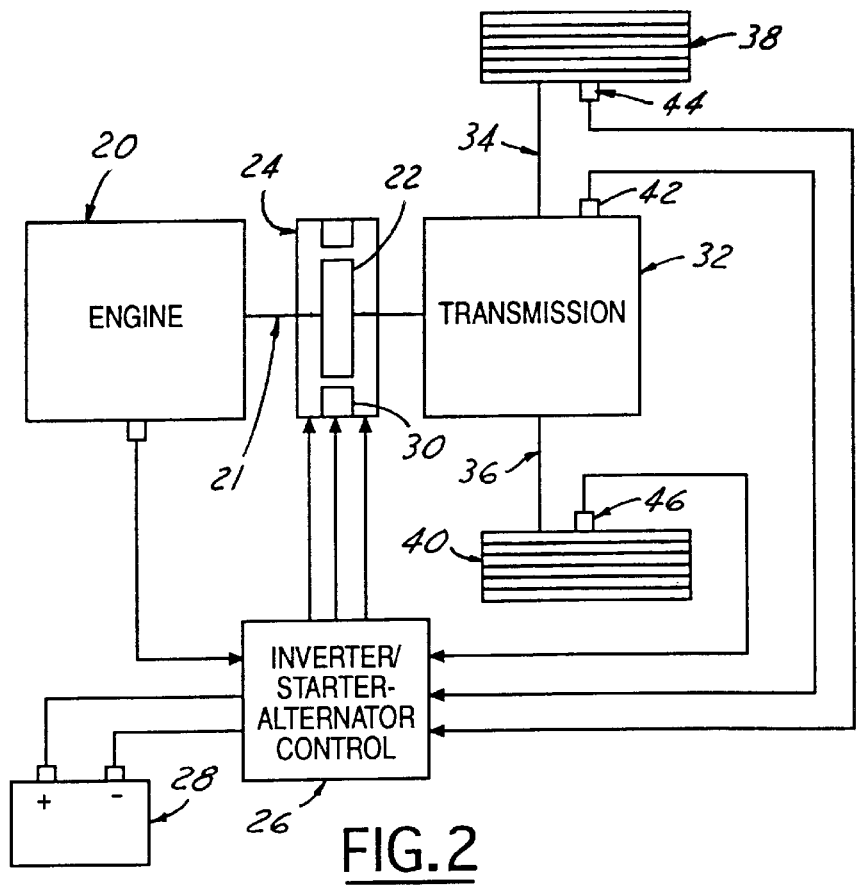
FIG. 2 is a block diagram of a motor vehicle powertrain including a starter-alternator 24 interposed between an engine 20 and a transmission 32.

Refer to FIG. 2. Illustrated there is the powertrain of a motor vehicle such as a hybrid electric vehicle ("HEV"). The powertrain includes an engine 20, such as an internal combustion engine. Coupled to crankshaft 21 of engine 20 is rotor 22 of a motor-generator, such as starter-alternator 24. Starter-alternator 24 is preferably an induction machine, though other electric machine designs can readily be used. Starter-alternator 24 is controlled by control module 26. Control module 26 includes semiconductor switches to act as an inverter for converting DC electrical power from battery 28 to three-phase AC power provided to stator 30 of starter-alternator 24. Control module 26 also preferably includes control circuitry for control of the semiconductor switches, as well as machine control logic for control of starter-alternator 24. It should be recognized that many sensors for effecting such control are not shown in FIG. 2, as they are not germane to the present invention and a need for them will be readily recognized by those of ordinary skill in the art. Starter-alternator 24 acts as a starter motor for cranking engine 20, as a generator when the output of engine 20 is greater than necessary to drive the vehicle, and as a motor to provide supplementary torque as necessary.

Transmission 32 is preferably an automatic transmission such as a "step ratio" planetary gear transmission or a continuously-variable transmission. In FIG. 2, transmission 32 is actually a transaxle for a front wheel drive vehicle. Driven by transmission 32 are two "half-shafts" 34 and 36, coupled to drive wheels 38 and 40, respectively, of the vehicle.

Clutches may also be provided between engine 20 and starter-alternator 24 and between starter-alternator 24 and transmission 32, depending upon the exact functionality desired of the hybrid vehicle's powertrain.

A transmission output speed (TOS) sensor 42 senses the speed at the output of the transmission (i.e., at the driven ends of half-shafts 34 and 36. Further, wheel speed (WS) sensors 44 and 46 sense the wheel speeds of driven wheels 38 and 40. Additionally, an engine speed sensor 48 senses the rotational speed of engine 20. The signals of each of the above sensors are made available to control module 26, either by hard-wiring or through a data communication link from other module(s) to which the sensors are directly coupled.

Figure 3A:
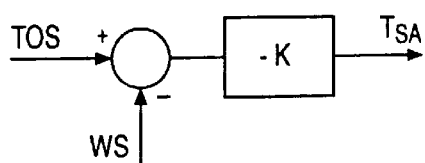
FIG. 3A illustrates the determination of starter-alternator torque to dampen drivetrain oscillations, according to one embodiment of the present invention.
Figure 3B:
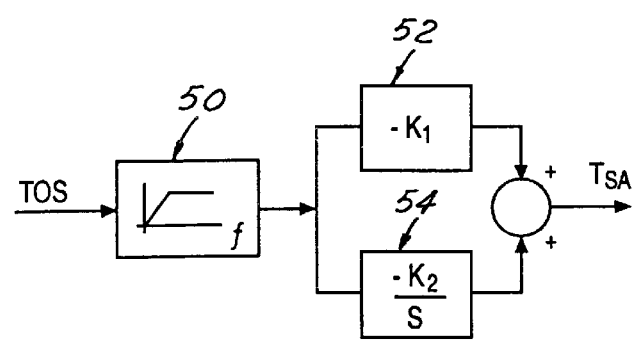
FIG. 3B illustrates the determination of starter-alternator torque to dampen drivetrain oscillations, according to a second embodiment of the present invention.
Figure 3C:
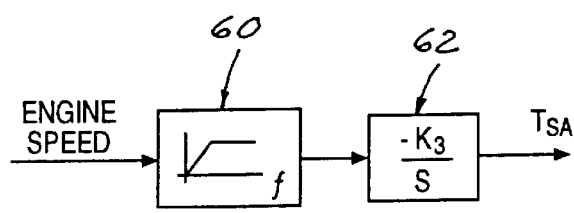
FIG. 3C illustrates the determination of starter-alternator torque to dampen drivetrain oscillations, according to a third embodiment of the present invention.

In a first variation of the present invention, starter-alternator 24 is controlled to provide a countertorque which is based on the "wind-up" speed of a half-shaft 34 or 36. The "wind-up" speed is the difference between the speed at the driven end of the half-shaft and the end coupled to the drive wheel. Refer additionally to FIG. 3. In this variation of the present invention, the countertorque $T_{SA}$ commanded by control module 26 is a proportional function of the difference between the transmission output speed and a wheel speed. FIG. 3 shows this relationship in block diagram form. As an example of the performance with the gain K of FIG. 3 selected as 50 Nms/radian, refer to FIG. 4. The "undamped" curve shows the wheel torque without any damping provided by starter-alternator 24. The "damped" curve shows the wheel torque with damping provided by starter-alternator 24. Clearly, the damping provided by starter-alternator 24 almost completely eliminates the oscillations present in the undamped case. If appropriate in a given case, the proportional control applied can be combined with integral and/or derivative control, or other known control methodologies can be employed. Also, the countertorque $T_{SA}$ can be a function of a difference between the transmission output speed and the average of the speeds of the driven wheels of the vehicle.

Figure 4:
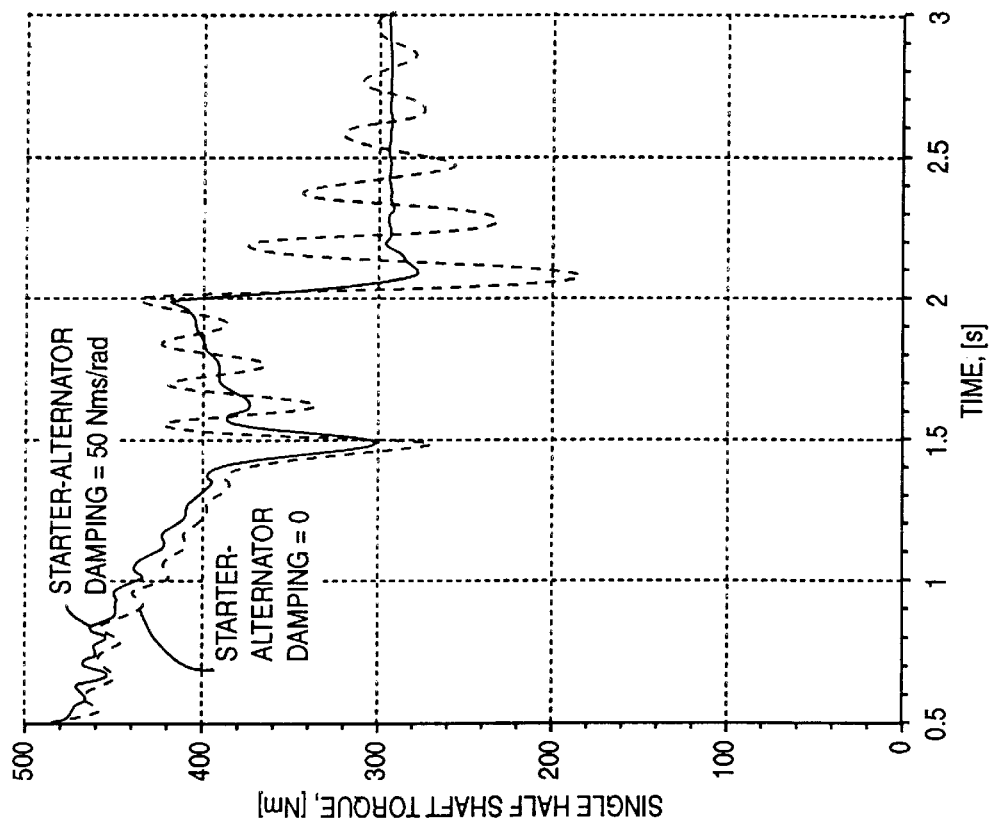
FIG. 4 illustrates damping performance of the embodiment of FIG. 3A.
Figure 1:
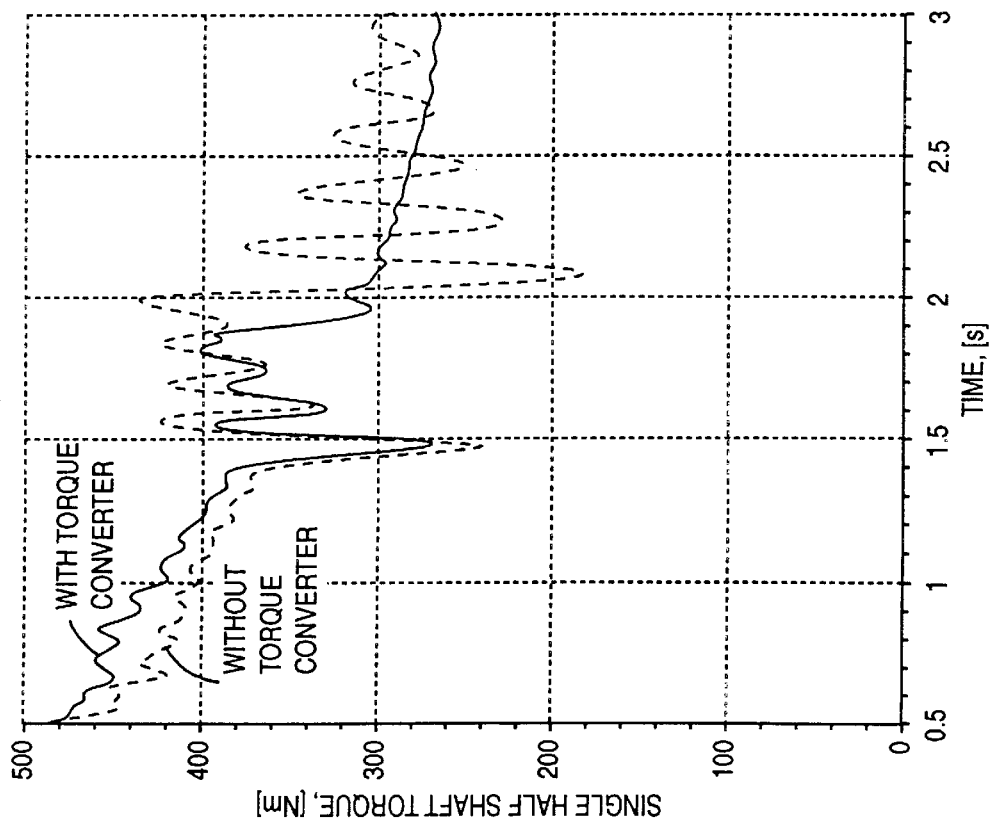
FIG. 1 is a graph of driven wheel torque versus time during a transmission upshift for a prior art vehicle having a torque converter and for the same vehicle having the torque converter removed.
Figure 5:
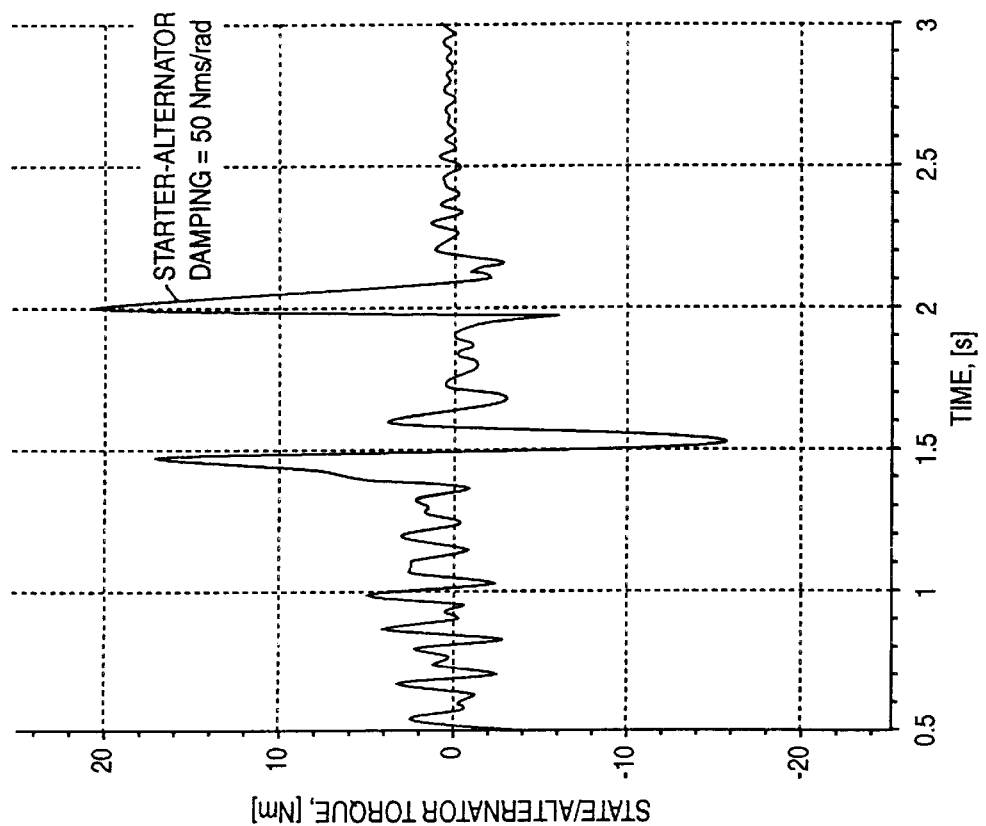
FIG. 5 illustrates the damping torque applied by starter-alternator 24 to provide the damping performance illustrated in FIG. 4.

Referring additionally to FIG. 5, illustrated there is the torque provided by starter-alternator 24 in the just-discussed example of FIG. 4.

Figure 6:
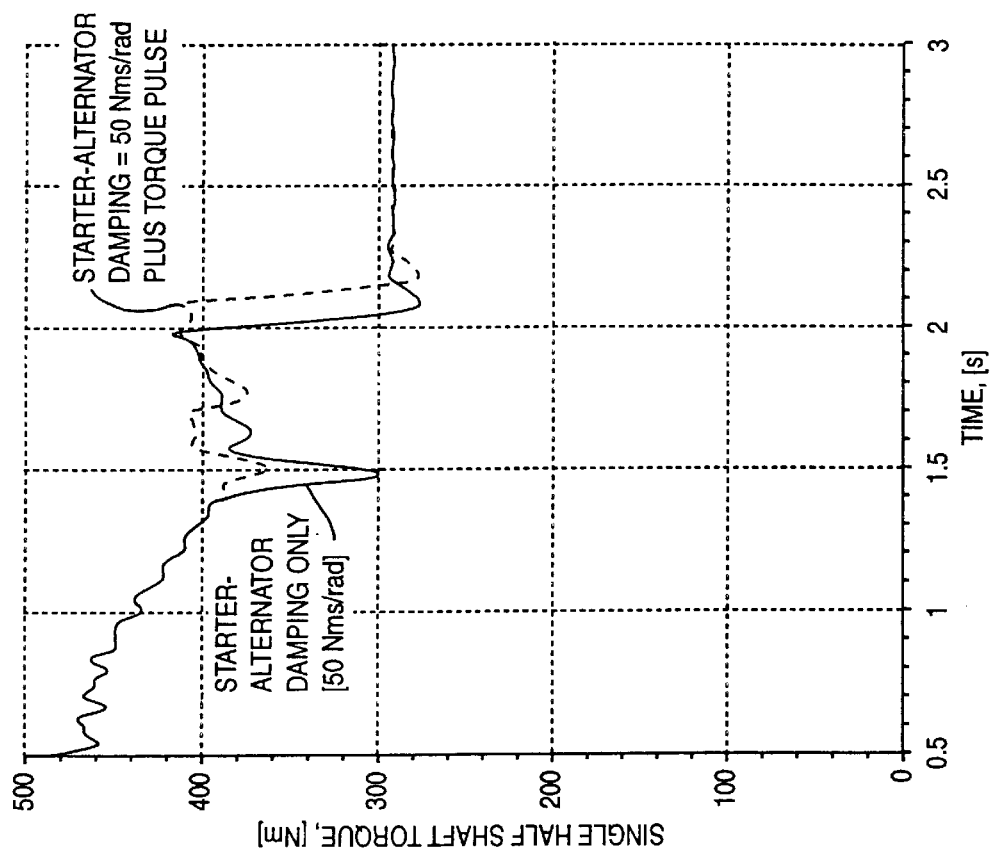
FIG. 6 illustrates the effect of a modification o,f the embodiment of FIG. 3A to add a one-time torque pulse.

One will note in FIG. 4 that a torque hole at t=1.4 seconds still exists, however, even when starter-alternator 24 is acting to provide damping. This hole can be reduced if starter-alternator 24 is commanded to provide a torque "pulse" to counteract the torque hole. Refering to FIG. 6, the effect of a 0.3 second, 30 N-m torque pulse applied at t=1.4 seconds is illustrated. The torque hole at t=1.4 seconds is substantially reduced. Timing, intensity and duration of such a torque pulse can be determined through vehicle testing, laboratory testing or adaptive learning during the vehicle's operation.

Figure 7:
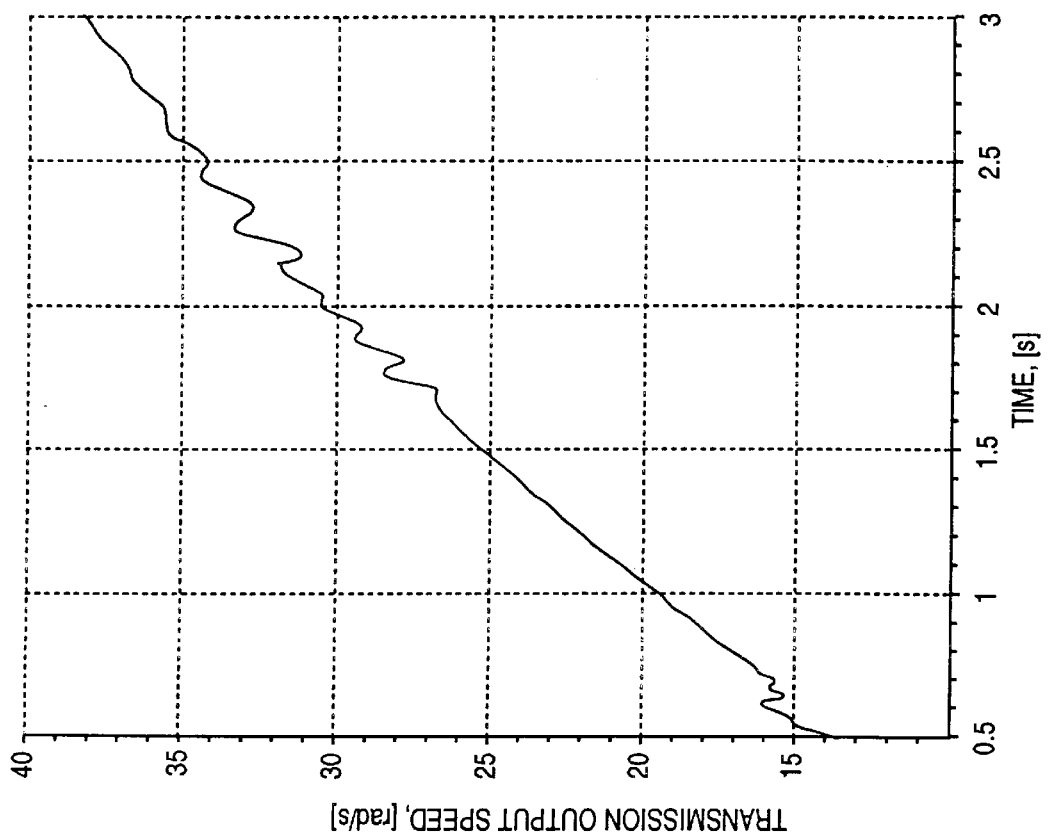
FIG. 7 illustrates the speed of the output of transmission 32 versus time during an upshifting event.

A more cost-effective system might be provided if reliance on actual sensing of wheel speed signals can be dispensed with. It has been observed by the inventors that much of the useful information provided by the "wind-up" speed of the half-shafts is available in the transmission output speed signal alone. Refers to FIG. 7 and 3B. In FIG. 7, it is seen that at t=1.4 seconds, higher frequency content begins to appear in the transmission output speed signal. The transmission output speed signal can be high-pass filtered (block 50), in order to remove the low frequency content of the signal attributable to acceleration of the vehicle. For some vehicles, the shuffle-mode oscillations which we wish to dampen occur in the range of 5 to 8 hertz. For this example, two cascaded first-order high-pass filters having break frequencies of 0.75 hertz were used. Proportional (block 52) and integral (block 54) control can be applied to result in the commanded torque to be provided by starter-alternator 24.

Figure 8:
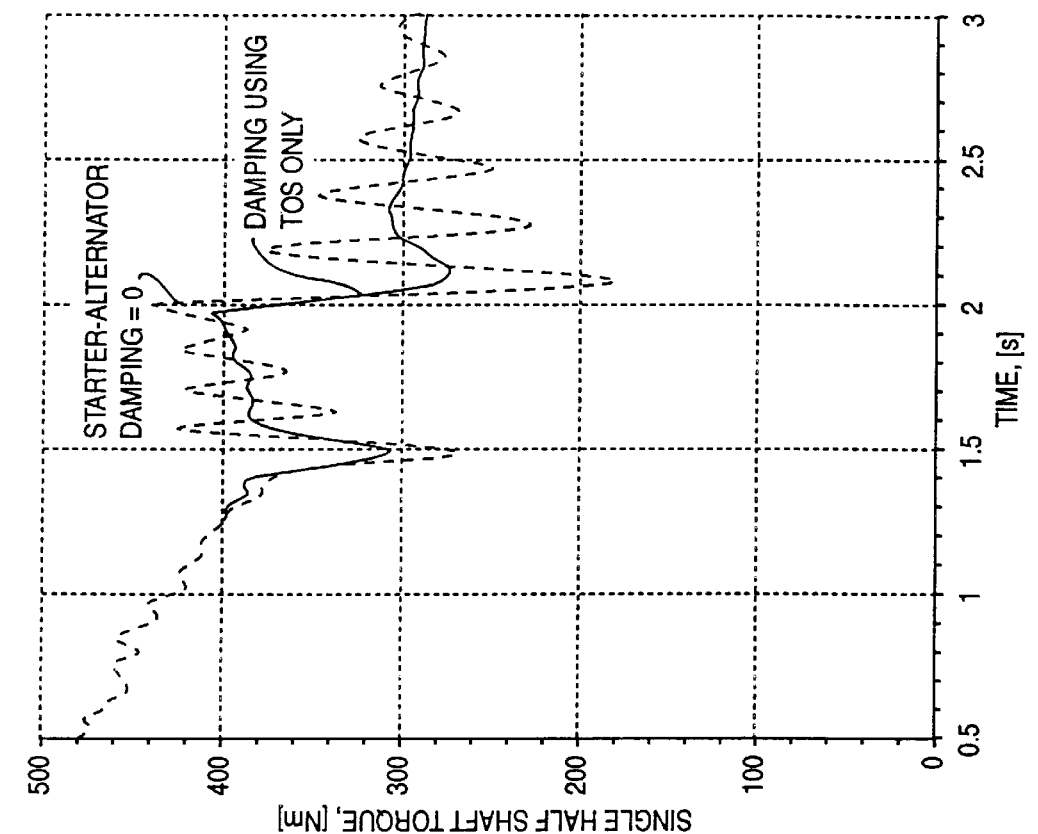
FIG. 8 illustrates damping performance of the embodiment of FIG. 3B.

FIG. 8 shows the result of using filtered transmission output speed instead of half-shaft wind-up speed, as described immediately above. Compared with the curve where no damping is supplied by starter-alternator 24, damping using the transmission output speed signal alone is very effective to reduce wheel torque oscillations.

A more precise way of selecting the filter for block 50 relies on using models of a half-shaft, the tire/road interface and the vehicle's mass reflected to the drive wheel. The derivation (which is not provided here for the sake of brevity) indicates that a high-pass filter having a transfer function of the following form will work well to isolate the half-shaft wind-up speed from the transmission output speed signal:

$$\frac{\Delta \omega}{\omega_t} = \frac{\omega_t - \omega_{so}}{\omega_t} \approx \frac{ms^2}{ms^2 + \frac{km}{b}s + k},$$

where
$\omega_t$=transmission output speed
$\omega_{so}$=half-shaft output speed (wheel speed)
k=half-shaft stiffness translated into the rotational domain
m=vehicle mass translated into the rotational domain
b=tire/road friction translated into the rotational domain.
Using nominal values for the parameters in the above equation results in:

$$\frac{\Delta \omega}{\omega_t} \approx \frac{85.3s^2}{85.3s^2 + 597s + 9792}.$$

This model-based approach to selecting the transfer function to be employed may also include various nonlinearities in the vehicle's driveline. Thus, in alternative embodiments of the present invention, the transfer function may vary in form from a simple linear filter.

Figure 10:
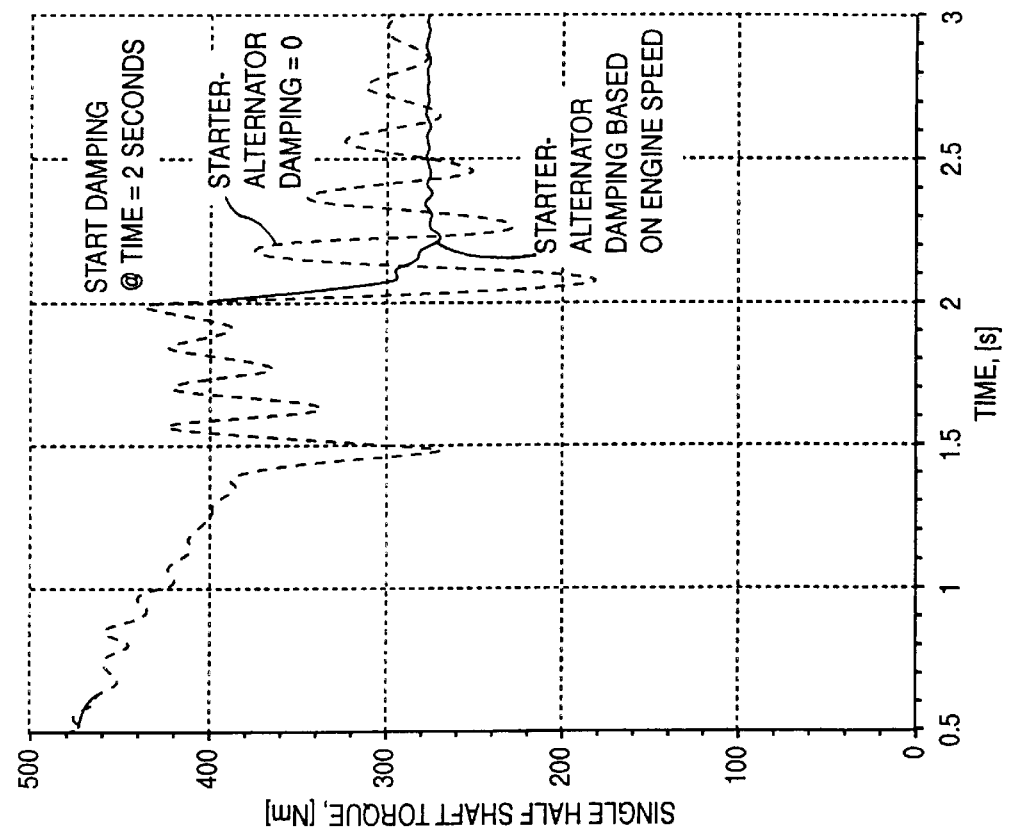
FIG. 10 illustrates damping performance of the embodiment of FIG. 3C.
Figure 9:
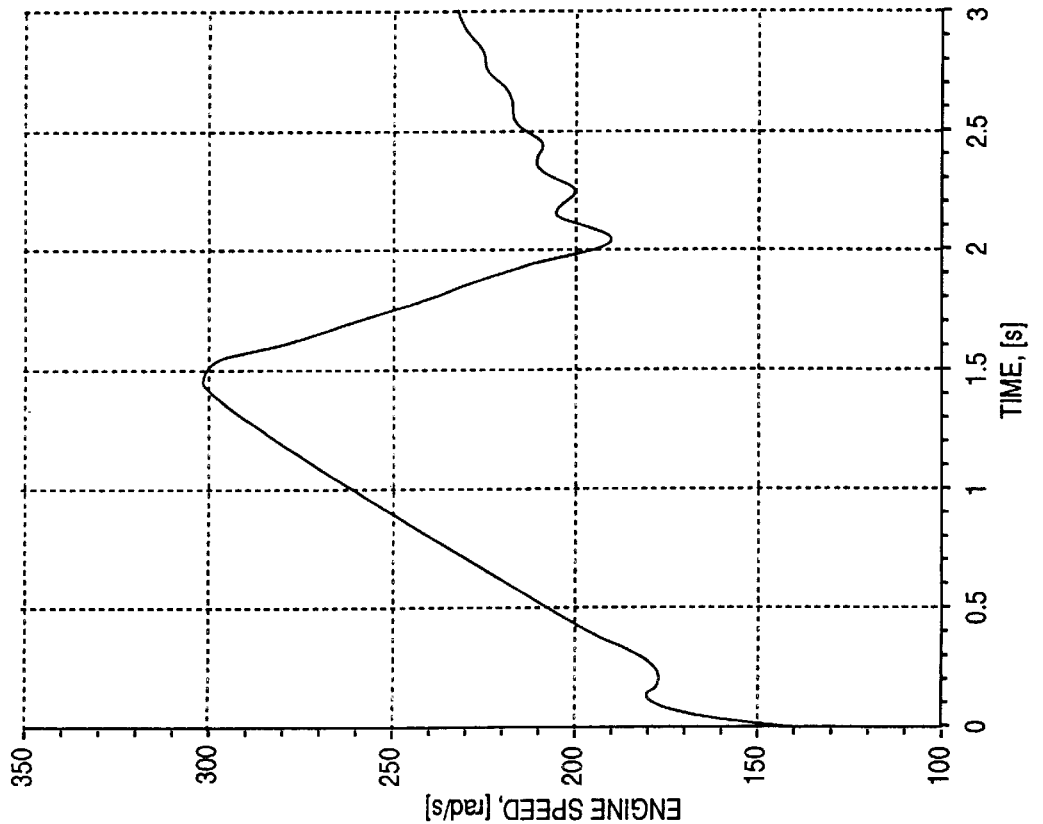
FIG. 9 illustrates the speed of engine 20 versus time during an upshifting event.

An additional variation of the present invention can also be employed. Here, instead of the variation of using only transmission output speed for control of starter-alternator 24 (FIGS. 3B and 8), engine speed alone can be used. Refer to FIG. 9, where engine speed variation during a shift event is illustrated. Higher-frequency content is apparent at time t=2.0 seconds (the approximate end of the shift), due to the disturbance in the system invoked by the transmission shift event. The information contained in the engine speed signal at that point can be used to control starter-alternator 24 to provide countertorque for damping wheel torque oscillations. Refer additionally to FIG. 10. In FIG. 10, damping is applied by starter-alternator 24 only beginning at t=2.0 seconds. At that point, oscillations are very significantly damped when compared to the undamped case. The control applied in FIG. 10 is diagramatically shown in FIG. 3C. Filtering (block 60) is applied to eliminate the lower-frequency components of the engine speed signal. In this case, two cascaded first-order 4 Hertz high-pass filters were employed. Pure integral control (block 62) is then preferred, as it has been observed that during the time period of interest, the engine output speed signal leads the half-shaft wind-up speed by about 90 degrees.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. In a motor vehicle comprising an engine, an electrical machine coupled to provide supplemental torque to a torque provided by said engine, a transmission having an input coupled to receive torque provided by said engine, and at least one wheel shaft driven by an output of said transmission, said wheel shaft having a driven end and an end coupled to a respective wheel of said motor vehicle, a method for suppressing driveline oscillations comprising:

for at least one said wheel shaft, sensing a difference in rotational speed between said driven end of said wheel shaft and said wheel shaft's respective wheel;

generating a torque command for said electrical machine to supply a torque which is a function of said difference.

2. A method for suppressing driveline oscillations as recited in claim 1, wherein said torque command is generated during a shifting event of said transmission.

3. A method for suppressing driveline oscillations as recited in claim 1, wherein said torque command contains a term proportional to said difference.

4. A method for suppressing driveline oscillations as recited in claim 1, further comprising commanding said electrical machine to supply a supplemental torque during an upshift event of said transmission to at least partially prevent a torque hole at said wheel.

5. A method for suppressing driveline oscillations as recited in claim 1, wherein sensing a difference in rotational speed between said driven end of aid wheel shaft and said wheel further comprises:

sensing a rotational speed at said output of said transmission; and sensing a rotational speed of said wheel.

6. In a motor vehicle comprising an engine, an electrical machine coupled to provide supplemental torque to a torque provided by said engine, a transmission having an input coupled to receive torque provided by said engine, and at least one wheel shaft driven by an output of said transmission, said wheel shaft having a driven end and an end coupled to a wheel of said motor vehicle, a method for suppressing driveline oscillations comprising:

sensing a rotational speed at said output of said transmission to generate a transmission output speed signal; and generating a torque command for said electrical machine to supply a torque which is a function of said transmission output speed signal.

7. A method as recited in claim 6, further comprising:

filtering said transmission output speed signal to substantially eliminate at least a low-frequency range of said signal below a frequency range of said oscillations and thereby generate a second signal;

wherein said torque command is a function of said second signal.

8. A method as recited in claim 6, further comprising processing said transmission output speed signal in view of one or more driveline characteristics of said motor vehicle to generate a second signal;

wherein said torque command is a function of said second signal.

9. A method as recited in claim 6, further comprising:

sensing rotational speeds of one or more of said wheels to generate one or more wheel speed signals;

wherein said torque command is a function of said one or more wheel speed signals.

10. A method as recited in claim 9, further comprising combining said one or more wheel speed signals to generate a combined wheel speed signal;

wherein said torque command is a function of said combined wheel speed signal.

11. A method as recited in claim 10, wherein combining said one or more wheel speed signals comprises averaging said one or more wheel speed signals.

12. A method for suppressing driveline oscillations as recited in claim 7, wherein said torque command is based at least in part on proportional control applied to said second signal.

13. A method for suppressing driveline oscillations as recited in claim 7, wherein said torque command is based at least in part on integral control applied to said second signal.

14. A method for suppressing driveline oscillations as recited in claim 7, wherein said step of filtering said transmission output speed signal comprises high-pass filtering said transmission output speed signal.

15. A method for suppressing driveline oscillations as recited in claim 6, wherein said torque command is generated during a shifting event of said transmission.

16. A method for suppressing driveline oscillations as recited in claim 6, further comprising commanding said electrical machine to supply a supplemental torque during an upshift event of said transmission to at least partially prevent a torque hole at said wheel.

17. In a motor vehicle comprising an engine, an electrical machine coupled to provide supplemental torque to a torque provided by said engine, a transmission having an input coupled to receive torque provided by said engine, and at least one wheel shaft driven by an output of said transmission, said wheel shaft having a driven end and an end coupled to a wheel of said motor vehicle, a method for suppressing driveline oscillations comprising:

sensing a rotational speed of said engine to generate an engine speed signal;

filtering said engine speed signal to substantially eliminate at least a low-frequency range of said engine speed signal below a frequency range of said oscillations and thereby generate a second signal;

generating a torque command for said electrical machine to supply a torque which is a function of said second signal.

18. A method for suppressing driveline oscillations as recited in claim 17, wherein said torque command is based at least in part on integral control applied to said second signal.

19. A method for suppressing driveline oscillations as recited in claim 18, wherein said step of filtering said transmission output speed signal comprises high-pass filtering said engine speed signal.

20. A method for suppressing driveline oscillations as recited in claim 19, wherein said torque command is generated after a shifting event of said transmission, to counteract driveline oscillations introduced by said shifting event.

* * * * *